Jan. 6, 1970  S. C. MENDALL  3,487,569

SCARECROW

Filed Aug. 25, 1967

INVENTOR
SEATON C. MENDALL
BY

ATTORNEYS

United States Patent Office 3,487,569
Patented Jan. 6, 1970

3,487,569
SCARECROW
Seaton C. Mendall, 526 W. Lake Road,
Penn Yan, N.Y. 14527
Filed Aug. 25, 1967, Ser. No. 663,402
Int. Cl. G09f 19/00
U.S. Cl. 40—37                                2 Claims

ABSTRACT OF THE DISCLOSURE

A replica of a predatory bird, usually a hawk, is suspended or othewrise positioned above crop to be protected. The replica has outstretched wings in simulated flight and is permitted to move smoothly and freely with the air currents.

---

Bird damage to crops, especially to vine and tree fruit, represents a significant loss to growers, sometimes thirty percent or more. Such damage is particularly severe in young plantings that are easily reached and unprotected. Various devices have been tried with limited success, and all of the prior methods used have disadvantages. For instance, noisemakers can only be used in relatively remote areas and will scare off some birds but not other species. Stationary objects, such as mounted scarecrows, are usually ineffective and moving, flashy objects generally afford only a small degree of protection. Chemical repellants and poisons are obviously undesirable for crops and in any event, many of the most persistent birds, such as robins and orioles, are protected.

Therefore, it is an object of this invention to provide an economical and effective way to eliminate birds from a crop area. It is a further object of this invention to provide a scare crow device to frighten birds, which device need not be attended. It is a still further object of this invention to provide a scare-crow device and method of using same which can be safely used in a crop area without the disadvantages usually associated with eliminating birds. These and other objects will be apparent from the following disclosure.

Figure 1:
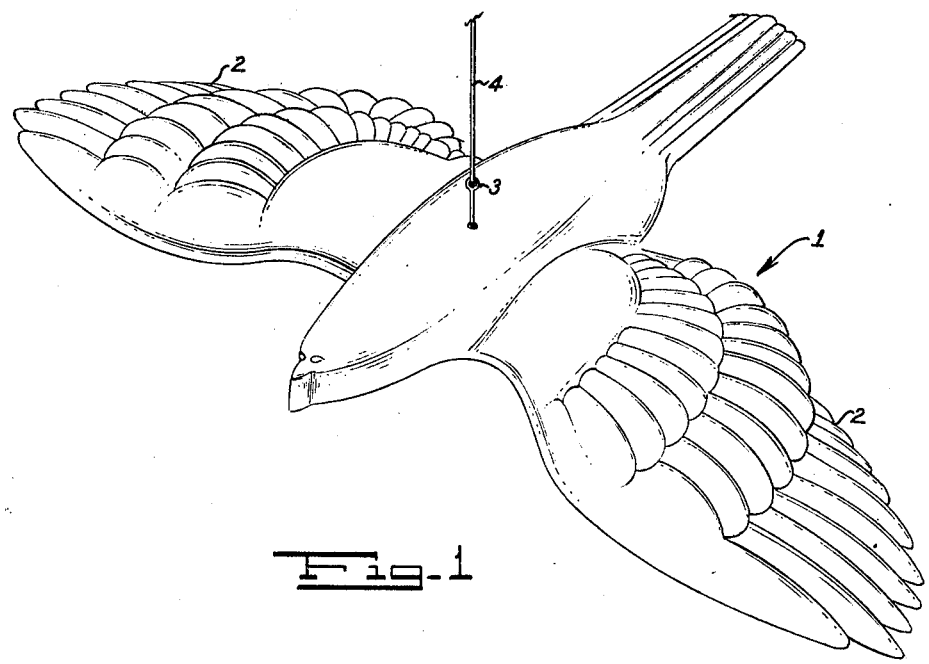
FIGURE 1 is a perspective view of a replica of a hawk.

In FIGURE 1, a replica 1 of a hawk or other predatory bird having outstretched wings 2 is shown. Preferably, the replica 1 is suspended and an eyebolt 3 is affixed to the top of the replica to which a wire dropline 4 or other flexible member is secured. The replica should be of a bird which normally hunts during the day and preferably a simulated hawk in flight is used.

The main objective in suspending the replica 1 is to permit it to "float" or appear to be hovering in search of prey. Thus, dropline 4 should be of a length which does not permit the replica to bounce or hop in a breeze. Using a hawk measuring about thirty-five inches across the wings and twenty-one and one-half inches in length weighing about one and one-half pounds, it has been found that dropline 4 should be about four feet long or longer for the desired effect.

Figure 2:
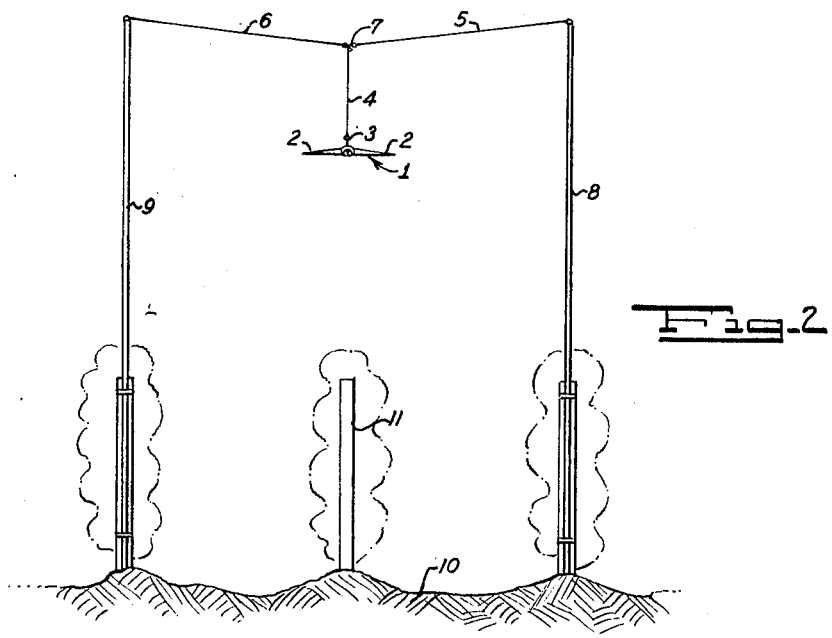
FIGURE 2 is a front elevation showing the replica of FIGURE 1 correctly placed in a vineyard.

As seen in FIGURE 2, the hawk replica is suspended from dropline 4 which is held by a swivel 7 at the connection between lines 5 and 6. Lines 5 and 6 are connected to supports 8 and 9 respectively, which supports can be aluminum piping, bamboo poles or the like, so long as the supports are sturdy enough to resist wind-whipping. Also, the replica can be held between trees or buildings, but in any event above the site or locus 10 to be protected, and preferably ten feet or more above the crop.

In FIGURE 2 the locus 10 being protected is a grape vineyard and the replica 1 is held about ten feet above the trellis 11. In such vineyards, experiments have shown that a hawk replica held about ten feet above the crop can protect about sixty-four hundred square feet of crop area in a circular pattern having a radius of forty-five to fifty feet. The supports used were twenty-one foot lengths of three-quarter-inch pipe and a nylon (size 18, test 160 pounds) dropline was used.

Previous experiments have shown that once birds have commenced feeding, it is difficult to frighten the feeding birds away from crop. Noisemakers, while normally effective to deter crows, starlings and doves, are ineffective in repelling robins and orioles, which are particularly destructive to grapes. It is an added advantage of the present invention that birds are frightened off before extensive feeding and damage occur. Frequently such birds will be seen entering an area protected by suspended hawk replicas, but these same birds will land and after a moment or two leave the area being serviced by hawk replicas.

In one vineyard experiment, a replica of a Cooper's hawk was suspended at a height of sixteen feet above the crop floor and about ten feet above the crop. The replica was plastic, having a gray color. In vineyards where the birds were undisturbed and fruit damage had previously approximated thirty percent, very little damage occurred and the only damage was found along the edges of a circle about forty-five feet from the suspended hawk. The area tested was adjacent to woods known to be infested with robins and orioles. Using one hawk replica for every 6400 square feet, about seven replicas would be required for each acre.

In the above experiment, several plastic owls without extended wings and many aluminum pie tins were suspended from trellis post extensions in the vineyard where the distance was more than two hundred feet from a hawk replica in flight, and no protection was noted regardless of the presence of the owls and flashing tins.

From the foregoing, it is apparent that many variations of the present invention are obvious. Thus, the details of the replicas used and other conditions are illustrative and should not be construed as limiting.

Having thus described my invention, what I claim as new and desire to secure by Letters Patent of the United States is:

1. A scarecrow comprising a replica of a predatory bird suspended above the locus to be protected, said replica having its wings spread in simulated flight to resemble a bird hovering above a prospective hunting area, said replica being suspended by a flexible drop line at least ten feet above the crop site to be protected, a second line being connected to spaced apart supports, holding means for securing said drop line to said second line between said supports whereby said replica is more or less fixed in position with respect to said supports, said supports being sufficiently high to suspend said replica at least four feet below said second line whereby said replica resists bouncing movements and simulates the hovering movements of a predatory bird in the air currents.

2. The scarecrow of claim 1 wherein the replica is of a Cooper's hawk and is gray in color.

References Cited

UNITED STATES PATENTS 1,329,044   1/1920   Farnam _____ 40—37

FOREIGN PATENTS 334,338   9/1930   Great Britain.

EUGENE R. CAPOZIO, Primary Examiner

RICHARD CARTER, Assistant Examiner

U.S. Cl. X.R.

40—126